United States Patent
Kordonski et al.

(10) Patent No.: US 6,955,589 B2
(45) Date of Patent: Oct. 18, 2005

(54) DELIVERY SYSTEM FOR MAGNETORHEOLOGICAL FLUID

(75) Inventors: William Kordonski, Webster, NY (US); Stephen Hogan, Rush, NY (US); Jerry Carapella, Pittsford, NY (US)

(73) Assignee: QED Technologies, Inc., Rochester, NY (US)

( * ) Notice: Subject to any disclaimer, the term of this patent is extended or adjusted under 35 U.S.C. 154(b) by 470 days.

(21) Appl. No.: 09/862,245

(22) Filed: May 22, 2001

(65) Prior Publication Data
US 2002/0177392 A1 Nov. 28, 2002

(51) Int. Cl.[7] .................................................. B24B 1/00
(52) U.S. Cl. ........................... 451/60; 451/5; 451/8; 451/36; 451/38; 451/87; 451/91; 451/93; 451/101; 451/102; 137/909
(58) Field of Search ......................... 451/5, 8, 36, 38, 451/60, 87, 91, 93, 101, 102; 137/909

(56) References Cited

U.S. PATENT DOCUMENTS

| | | | | |
|---|---|---|---|---|
| 5,334,497 A | * | 8/1994 | Inaba et al. | 435/3 |
| 5,922,131 A | * | 7/1999 | Haas | 118/629 |
| 5,951,369 A | * | 9/1999 | Kordonski et al. | 451/5 |
| 5,971,835 A | | 10/1999 | Kordonski et al. | |
| 6,106,380 A | * | 8/2000 | Jacobs et al. | 451/360 |
| 6,158,470 A | * | 12/2000 | Ivers et al. | 137/807 |

* cited by examiner

Primary Examiner—Joseph J. Hail, III
Assistant Examiner—Shantese L. McDonald
(74) Attorney, Agent, or Firm—Neal L. Slifkin; Robert C. Brown (57) ABSTRACT

A magnetorheological fluid delivery system includes a mixing and tempering vessel. Fluid is admitted to the vessel via a plurality of tangential ports, creating a mixing of the fluid in the vessel and promoting homogeneity. Fluid may be reconstituted in the vessel by metered addition of carrier fluid. A fixed-speed centrifugal pump disposed in the vessel pressurizes the system. Fluid is pumped through a magnetic-induction flowmeter and a magnetic flow control valve having solenoid windings whereby MR fluid is magnetically stiffened to restrict flow. A closed-loop feedback control system connects the output of the flowmeter to performance of the valve. A nozzle having a slot-shaped bore dispenses MR fluid for re-use in the work zone. A planar-diaphragm flush-mounted pressure transducer at the entrance to the nozzle and flowmeter inferentially measure relaxed viscosity and provide signals to a computer for dispensing metered amounts of carrier fluid into the mixing vessel to assure correct composition of the reconstituted fluid as it is dispensed.

6 Claims, 7 Drawing Sheets

DELIVERY SYSTEM FOR MAGNETORHEOLOGICAL FLUID

BACKGROUND OF THE INVENTION

1. Field of the Invention

The present invention relates to methods and apparatus for circulating and dispensing fluids; more particularly, to methods and apparatus for circulating and dispensing fluids having magnetorheological properties; and most particularly, to methods and apparatus for managing and metering magnetorheological fluids being used in a magnetorheological finishing apparatus.

2. Discussion of the Related Art

It is well known in the art of finishing and polishing surfaces to use, as a finishing agent, particulate fluid suspensions having magnetorheological properties. Such fluids, known as magnetorheological fluids (MR fluids), comprise magnetically soft particles which can become oriented and magnetically linked into fibrils in the presence of a superimposed magnetic field, thereby increasing the apparent viscosity of the fluid by many orders of magnitude. Such increase is known as magnetic "stiffening" of the MR fluid. It is further known to incorporate finely-divided abrasives into MR fluids used in finishing and polishing to increase the rate of removal of material. Non-stiffened, or magnetically relaxed, MR fluid can be stored and pumped as a low-viscosity fluid, having a viscosity typically of about 50 cp or less, then stiffened to a semi-rigid paste of $10^5$ cp or more in a magnetic work zone for finishing or polishing, then relaxed again outside the work zone for collection, reconditioning, and reuse. Apparatus and methods for magnetorheological finishing and for delivery of MR fluids are disclosed in, for example, U.S. Pat. No. 5,951,369 issued Sep. 14, 1999 and U.S. Pat. No. 5,971,835 issued Oct. 26, 1999, both to Kordonski et al., the relevant disclosures of which are herein incorporated by reference.

MR fluid finishing apparatus typically includes a fluid delivery system (FDS) for dispensing MR fluid onto a rotating carrier surface, whereon the fluid is carried into and out of the work zone. MR fluid is a relatively unstable suspension because the magnetic particles tend readily to agglomerate and to settle out of suspension and thereby stagnate. Thus, a primary concern in configuring an FDS for MR fluid is keeping the fluid relatively homogeneous in the system, and very highly homogeneous at the point of dispensing into the work zone. An FDS must receive spent fluid from the work zone, recondition the fluid for reuse as by adjusting the temperature and viscosity, homogenize the adjusted fluid, and redispense the fluid into the work zone at a controlled flow rate. A suitable prior art FDS is disclosed in U.S. Pat. No. 5,951,369 incorporated above.

Because of these various requirements, the prior art FDS is relatively complex and includes a first peristaltic pump for removing spent fluid from a scraper at the work zone and returning the fluid to a reservoir; a mixer in the reservoir for rehomogenizing the fluid; a tempering subsystem at the reservoir for cooling the fluid, which tends to become heated in the work zone; a second peristaltic pump and cylindrical nozzle having a fixed restriction for redispensing the fluid; a pulse-dampener for removing pulses generated by the pumps; and a viscosity measuring and correcting subsystem. Flow may be controlled by manually setting the speed of the second pump, and preferably is monitored via a magnetic induction flowmeter.

Several problems are presented by the prior art FDS.

First, the system is cumbersome, as it is essentially an assemblage of discrete components, each intended to perform a single task. Thus, the system is wasteful of space.

Second, the flow control system requires a positive-displacement (PD) pump. Some known PD pumps such as gear pumps are unsuited to the task of pumping MR fluids. A peristaltic pump can meet the positive-displacement need over a short period of time; however, the pulsating output mandates the pulse-dampening apparatus already noted, and the delivery lines within the pump are subject to fatigue and must be replaced frequently.

Third, correct composition of the MR fluid being redispensed is inferred from an inline viscometer which incorporates a cylindrical nozzle that, for flow reasons, must be relatively long and thus is cumbersome. In the flow and composition control strategy employed, a constant input pressure at the entrance to the nozzle and a constant flowrate at the flowmeter indicate a constant viscosity and hence constant composition of the fluid being dispensed.

What is needed is an improved fluid delivery system for managing MR fluid in an MR finishing apparatus wherein flow is inherently smooth, pulsations are not generated, and pulsation dampening is unnecessary; wherein the dispensing flow is maintained at a desired flowrate by a closed-loop flow control subsystem; wherein the composition of the MR fluid is automatically corrected to aim during a reconditioning step; wherein the sizes of components such as a dispensing nozzle are minimized; and wherein mixing, tempering, and pressurizing of MR fluid is performed in a single vessel.

It is a primary objective of the invention to provide a simple, compact fluid delivery system for managing and dispensing magnetorheological fluid for use by a magnetorheological finishing apparatus.

SUMMARY OF THE INVENTION

Briefly described, a magnetorheological fluid delivery system in accordance with the invention comprises various elements connected by conduit means, including a mixing and tempering vessel. Fluid being returned from use in a work zone is admitted to the vessel via a plurality of tangential ports near the bottom of the vessel, creating a mixing of the fluid in the vessel and thus promoting homogeneity. Fluid may be reconstituted in the vessel by metered addition of carrier fluid to compensate for carrier fluid lost in the work zone. A centrifugal pump, preferably operating at a fixed speed, collects the fluid from the vessel and pressurizes the system. Preferably, the pump is disposed in the vessel. Fluid is fed through a magnetic-induction flowmeter and a magnetic valve having solenoid windings whereby fluid may be controllably stiffened and thus flow restricted by the associated viscous drag created in the bore of the valve. A closed-loop feedback control system connects the output of the flowmeter to performance of the valve. A nozzle having a slot-shaped bore dispenses MR fluid for re-use in the work zone. A flush diaphragm pressure transducer at the entrance to the nozzle inferentially measures relaxed viscosity and provides signals to a computer for dispensing metered amounts of carrier fluid into the mixing vessel to assure correct composition of the reconstituted fluid as it is dispensed.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which.

DETAILED DESCRIPTION OF THE INVENTION

The benefits and advantages of a magnetorheological fluid delivery system in accordance with the invention may be better appreciated by first considering a prior art system.

Figure 1:
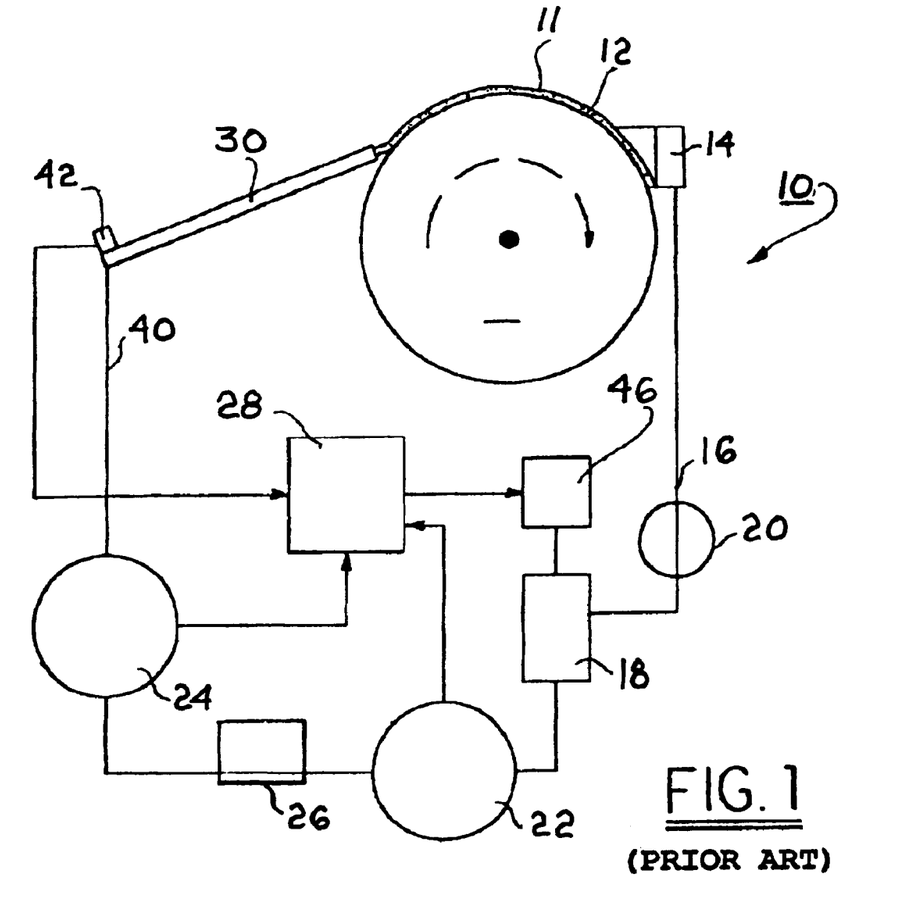
FIG. 1 is a schematic view of a prior art fluid delivery system for magnetorheological fluids, substantially as disclosed as FIG. 10 in U.S. Pat. No. 5,951,369.

Referring to FIG. 1, a prior art fluid delivery system 10 (FDS) is shown for providing MR fluid 11 to a carrier surface 12 of a magnetorheological finishing apparatus (not otherwise shown) at a constant aim flow rate and viscosity; for recovering MR fluid from the carrier surface; and for conditioning recovered MR fluid for re-use. MR fluid 11 is scraped from the carrier surface 12 by scraper 14 and returned via line 16 to an inline mixing and tempering vessel 18 wherein agglomerates are broken up, carrier fluid is replenished as described below, and the reconstituted MR fluid is re-tempered to an aim temperature. A prior art system typically includes a supplementary peristaltic pump 20 to acquire the spent MR fluid from scraper 14 and deliver it to vessel 18. Retempered MR fluid is withdrawn from vessel 18 by a primary peristaltic delivery pump 22 and is delivered through an inline magnetic-induction flowmeter 24. The output of peristaltic pumps is cyclic and therefore a pulse dampener 26 is required in the fluid delivery system downstream of pump 22. Flowmeter 24 and the drive for pump 22 are connected to a computer 28 which sets a flow aim and the rotational speed of the pump. From the flowmeter, MRF passes through nozzle 30 and is discharged for work onto carrier surface 12.

Figure 1A:
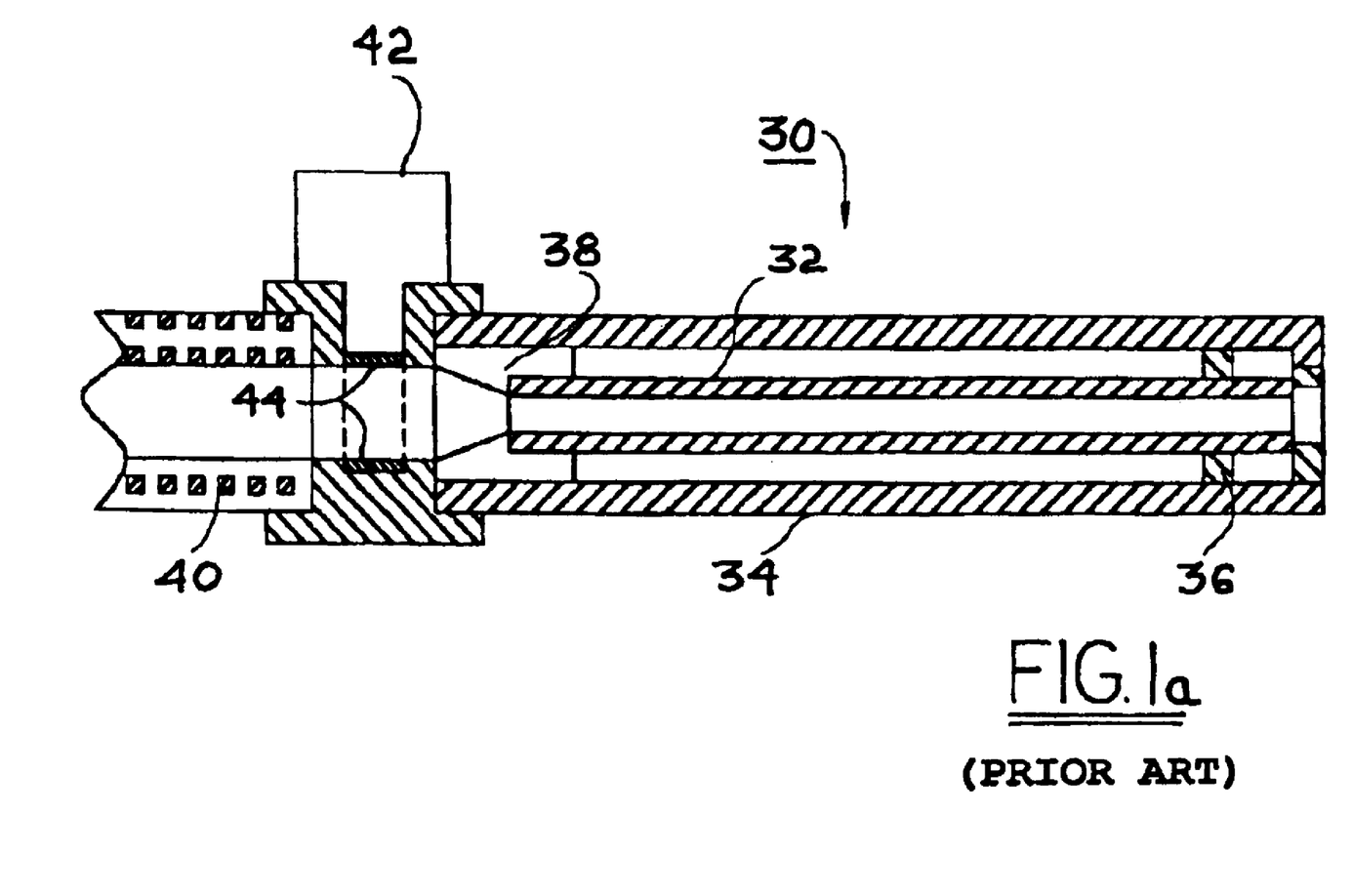
FIG. 1a is a cross-sectional view of a prior art nozzle useful in the delivery system shown in FIG. 1.

Referring to FIG. 1a, prior art nozzle 30 is an inline capillary rheometer or viscometer at the discharge end of the fluid delivery system and comprises a capillary tube 32 formed of a non-magnetic material, for example, stainless steel or ceramic, having a length to diameter ratio preferably greater than about 100:1. Tube 32 is surrounded by a magnetic shield 34 formed preferably of a magnetically soft material, for example, low-carbon cold rolled steel. Tube 32 and shield 34 are spaced apart by one or more non-magnetic centering spacers 36 and by a non-magnetic transition piece 38 for smoothly narrowing the MR fluid flow from the diameter of the supply line 40 to the diameter of tube 32. Disposed between supply line 40 and transition piece 38 is a pressure transducer 42 having a diaphragm 44 for sensing line pressure at the entrance to the capillary tube and sending a signal thereof to computer 28. Since nozzle 30 is disposed at the end of the delivery line, the pressure drop through the nozzle may be measured relative to ambient pressure, and thus only one pressure sensor is required. Computer 28 is programmed with an algorithm for calculating MR fluid viscosity as a function of pressure and flowrate through nozzle 30. When a predetermined upper viscosity control limit is exceeded, computer 28 signals metering pump 46 to inject a computer-calculated replenishing amount of carrier fluid into mixing/tempering chamber 18 where the fluid is mixed into the recirculating MRF.

Referring to FIGS. 2 through 7, an improved and compact fluid delivery system 50 (FDS) in accordance with the invention is shown for providing MR fluid to a carrier surface 12 of a magnetorheological finishing apparatus (not otherwise shown) at a constant aim flow rate and viscosity; for recovering MR fluid from the carrier surface; and for conditioning recovered MR fluid for re-use. System 50 includes significant improvements in mixing, pumping, metering, and dispensing over prior art system 10, and is significantly less complex and more compact. Several components of system 10 are eliminated, including supplementary pump 20 and pulsation dampener 26.

Figure 2:
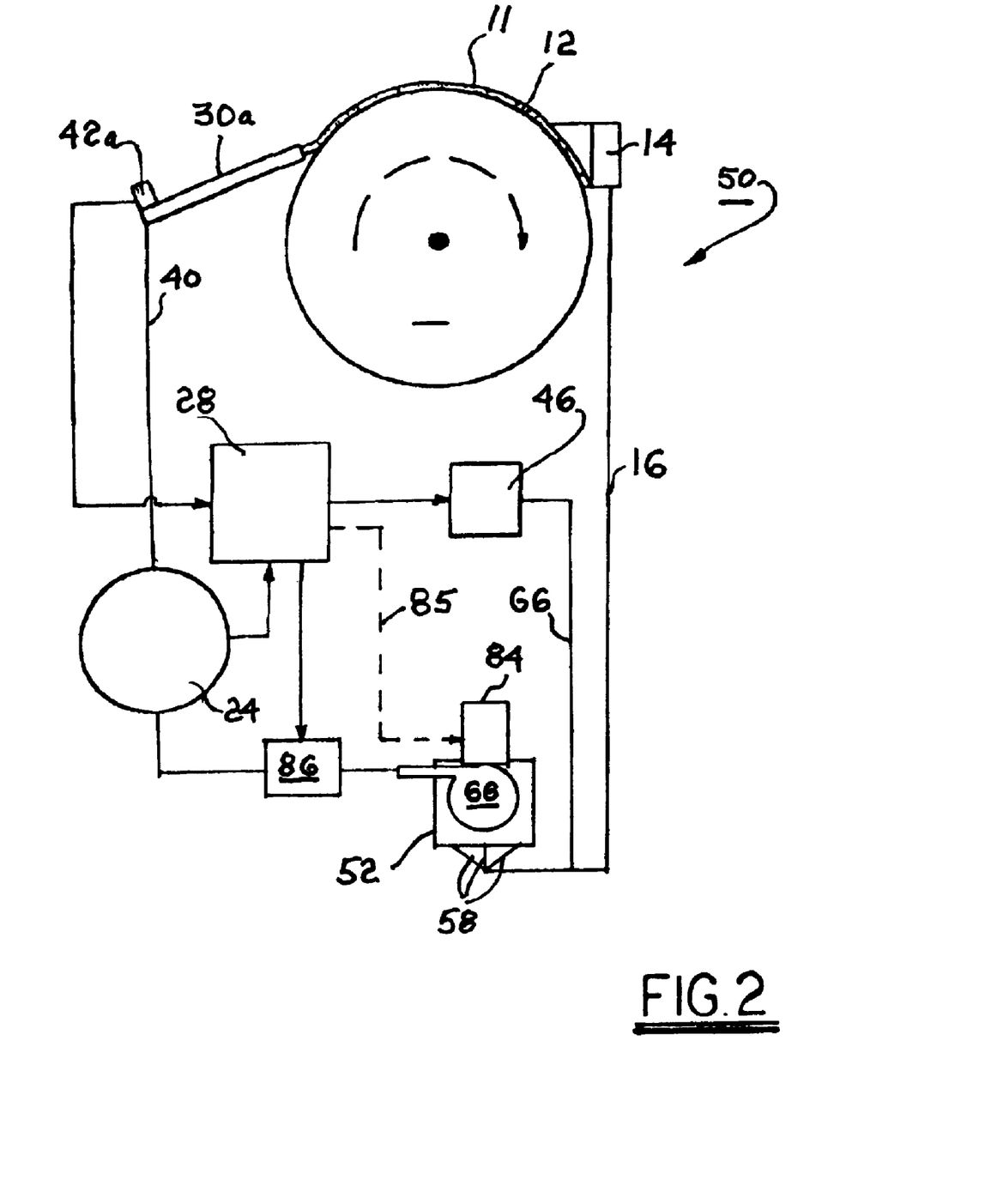
FIG. 2 is a schematic view of an improved fluid delivery system in accordance with the invention.

As shown in FIG. 2, MR fluid 11 is scraped from the carrier surface 12 by scraper 14 and returned via line 16 to an improved inline mixing and tempering vessel 52 wherein agglomerates are broken up, carrier fluid is replenished, and the reconstituted MR fluid is re-tempered to an aim temperature and prepared to be re-dispensed onto carrier surface 12.

Figure 3:
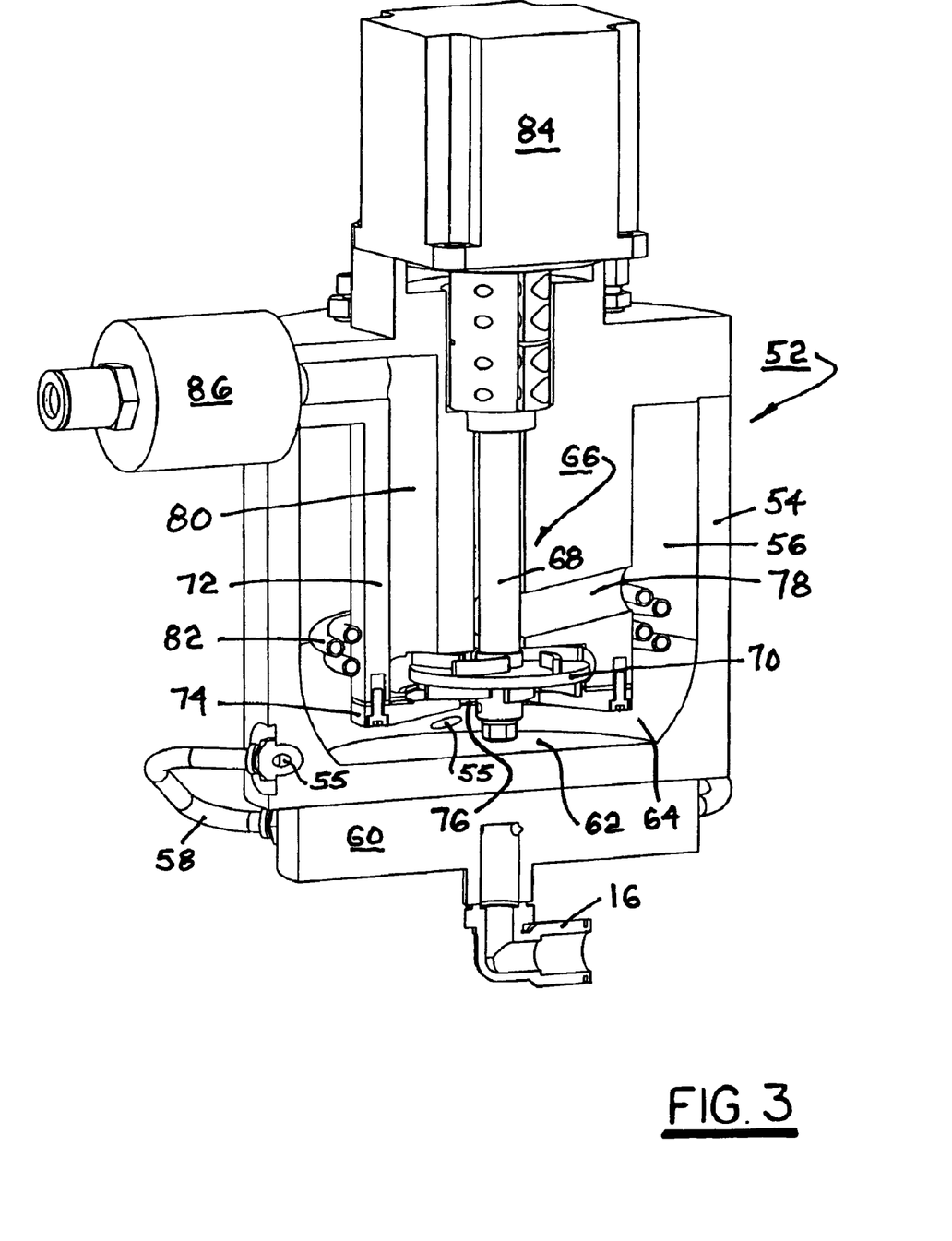
FIG. 3 is an isometric view, partially in cutaway, of a mixing/tempering vessel and a pressurizing pump.
Figure 4:
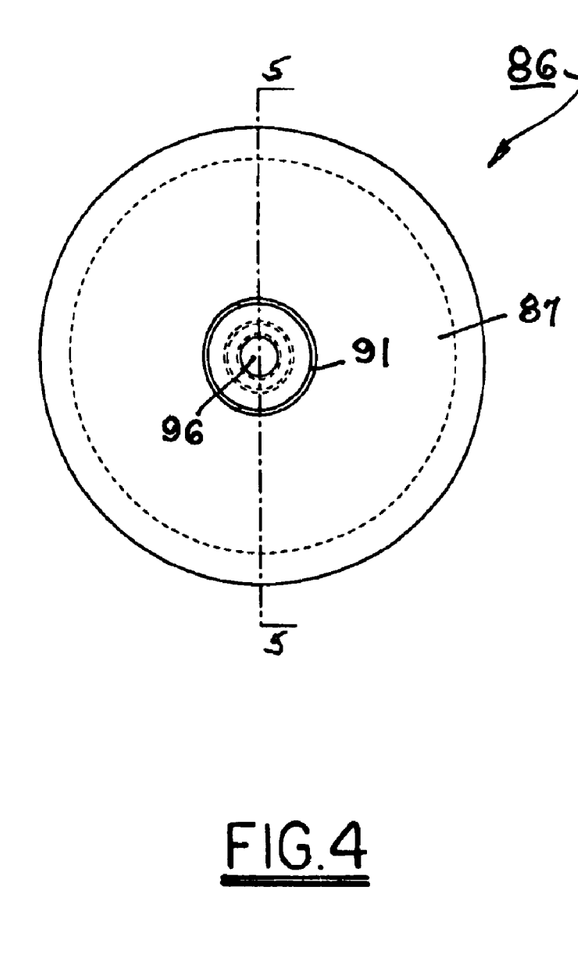
FIG. 4 is a plan view of a magnetic valve.

As shown in FIG. 3, improved vessel 52 includes an insulating jacket 54 surrounding a mixing chamber 56. Spent MR fluid being returned from scraper 14 is drawn into chamber 56 via at least one passage 58, and preferably a plurality of such passages, extending from a splitting block 60 on the underside of vessel 52 and entering into chamber 56 through jacket 54 at ports 55 near the bottom 62 of the chamber and substantially tangential to the inner wall 64 of the chamber. This configuration causes a high level of swirling agitation of MR fluid within chamber 56 without resort to a separate mechanical mixer as is required in prior art mixing chambers. MR fluid is drawn into splitting block 60 from return line 16, wherein the fluid flow is split into a plurality of streams following passages 58. As in the prior art system, replenishing carrier fluid is injected from a source (not shown) via replenishment pump 46 and line 66 in response to commands from computer 28, either into return line 16 as shown in FIG. 2 or directly into vessel 52.

Disposed within chamber 56 is a centrifugal pump 66 having a vertical drive shaft 68 supporting a conventional vaned impeller 70 near the bottom 62 of the chamber. Preferably, impeller 70 is vaned on both the upper and lower surfaces thereof to balance the pumping load and to increase the output volume. Pump housing 72 surrounds the shaft and impeller and is closed at its lower end by an end plate 74 having a central aperture 76 for receiving the outer end of shaft 68 and impeller 70 and for admitting MR fluid from the lower part of chamber 56 to impeller 70. Housing 72 is provided with an inlet passage 78 for admitting MR fluid from the upper part of chamber 56 to impeller 70. An outlet passage 80 extends within housing 72 from the periphery of impeller 70 through jacket 54 to the exterior of vessel 52. Housing 72 is further surrounded by tempering coils 82 of a conventional liquid heat exchanger tempering system (not shown) for adjusting the temperature of MR fluid within chamber 56 to a predetermined aim in known fashion.

Pump drive 84 is disposed outside and above vessel 52 and is coupled to shaft 68 via a central bore in housing 72, which housing also functions as the closing cover for vessel 52. Drive 84 is operationally connected via conventional interface conversion elements to control computer 28 which may, via connection 85, set and maintain the rotational speed of pump 66, preferably at a predetermined fixed speed selected to optimize the output of the pump, for example, 3200 rpm. Alternatively, the speed of the pump may be set manually by conventional electromechanical means.

Referring to FIGS. 3 through 6, a novel magnetic flow control valve 86 and a conventional magnetic induction flowmeter 24 are disposed inline downstream of pump 66. Flowmeter 24 senses the flow volume of material passing therethrough and communicates with computer 28 which then sends a controlling signal to valve 86 to adjust the flow sensed by flowmeter 24 to some predetermined aim. The flowmeter, valve, and computer thus form a conventional closed-loop feedback control system. Because pump 66 is a centrifugal pump and therefore non-positive-displacement, unlike prior art peristaltic pump 22, hydraulic slip can occur within the pump, permitting valve 86 simply to throttle the pump output.

Figure 5:
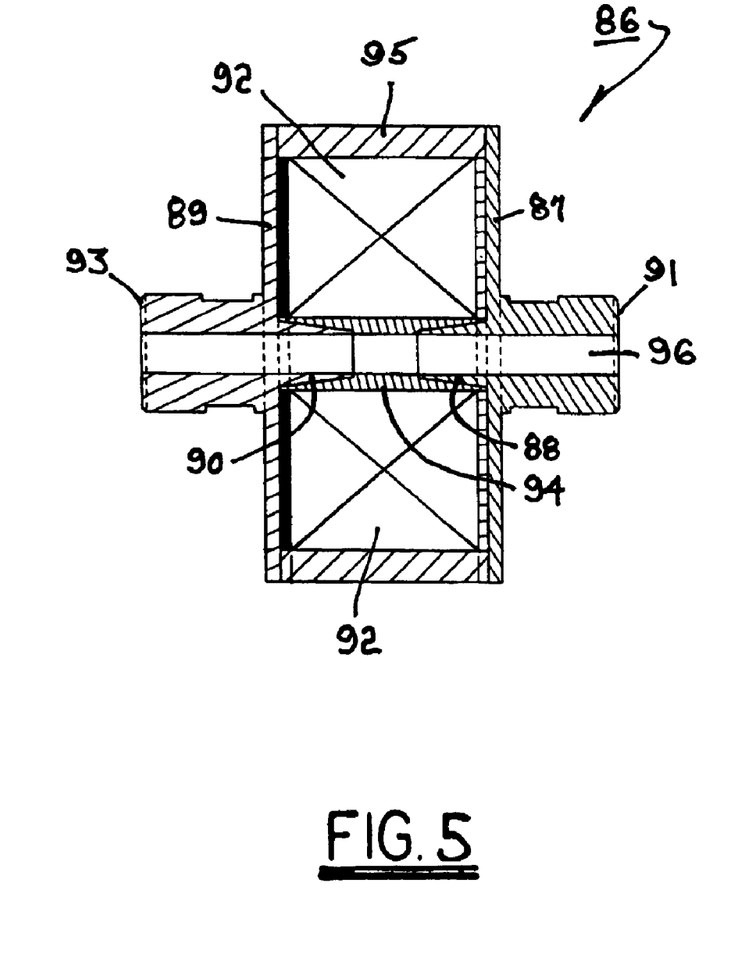
FIG. 5 is a cross-sectional view taken along line 5—5 in FIG. 4.
Figure 6:
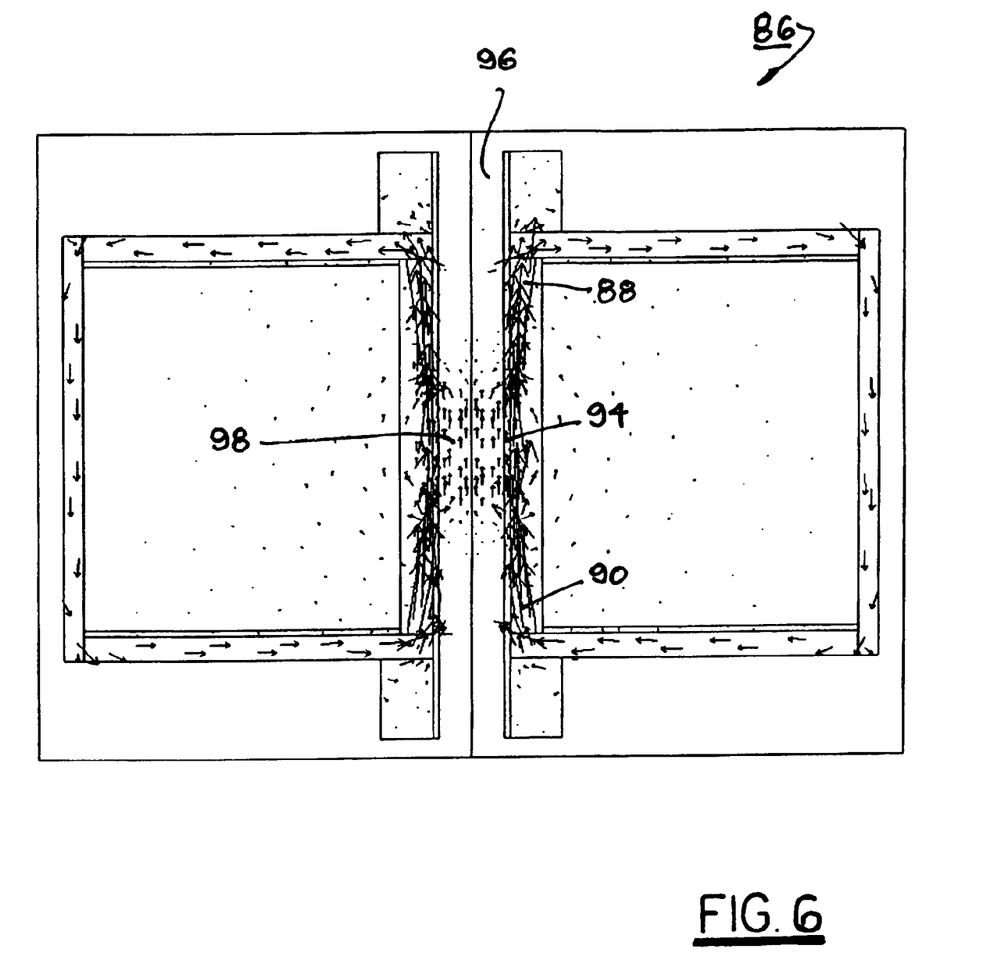
FIG. 6 is a schematic cross-sectional view of the valve shown in FIGS. 4 and 5, showing the direction and intensity of magnetic flux within the valve.

Magnetic flow control valve 86 comprises a solenoid without an armature, the MR fluid replacing the armature, and having first and second end caps 87,89 having first and second nipples 91,93, respectively for connection of the valve into the FDS. The end caps are magnetically linked by a cylindrical housing 95 which also functions as a magnetic shunt. Hollow first and second magnet polepieces 88,90, respectively extend axially towards each other from end caps 87,89, respectively, within windings 92 which may be, for example, 1000 ampere-turns. Polepieces 88,90 are separated by a non-magnetic spacer 94 also within the windings and preferably having an axial bore of the same diameter as the bores in the polepieces, such that the axial passageway 96 extending through valve 86 is of a single non-restricted diameter. Spacer 94 forms and fills a magnetic gap between the polepieces. Each of polepieces 88,90 is tapered toward the other, preferably conically, on an outer surface thereof as shown in FIGS. 5 and 6, such that magnetic flux is directed and concentrated towards the gap, creating a magnetic field 98 within passageway 96 in which the flux lines are substantially parallel to the axis of the passageway, as shown in FIG. 6. In operation, when the windings are de-energized, passageway 96 exerts low viscous drag on MR fluid flowing through the valve. Flow through the valve is limited only by the diameter of passageway 96, the output pressure of pump 66, and the mechanical restrictions in the FDS downstream of the valve. When the windings are controllably energized in response to signals from computer 28, MR fluid in the magnetic field is magnetically stiffened within the valve to a higher apparent viscosity, thus creating increased flow resistance due to viscous drag on the walls of passageway 96. Flow is thus controllably decreased from the non-energized level. The MR fluid becomes again relaxed, of course, upon passing out of the valve. By controllably varying the intensity of the magnetic field by varying the current through windings 92, computer 28 is able to control the flow through the FDS in response to a predetermined flow aim and to the actual flow as measured by flowmeter 24.

Figure 7:
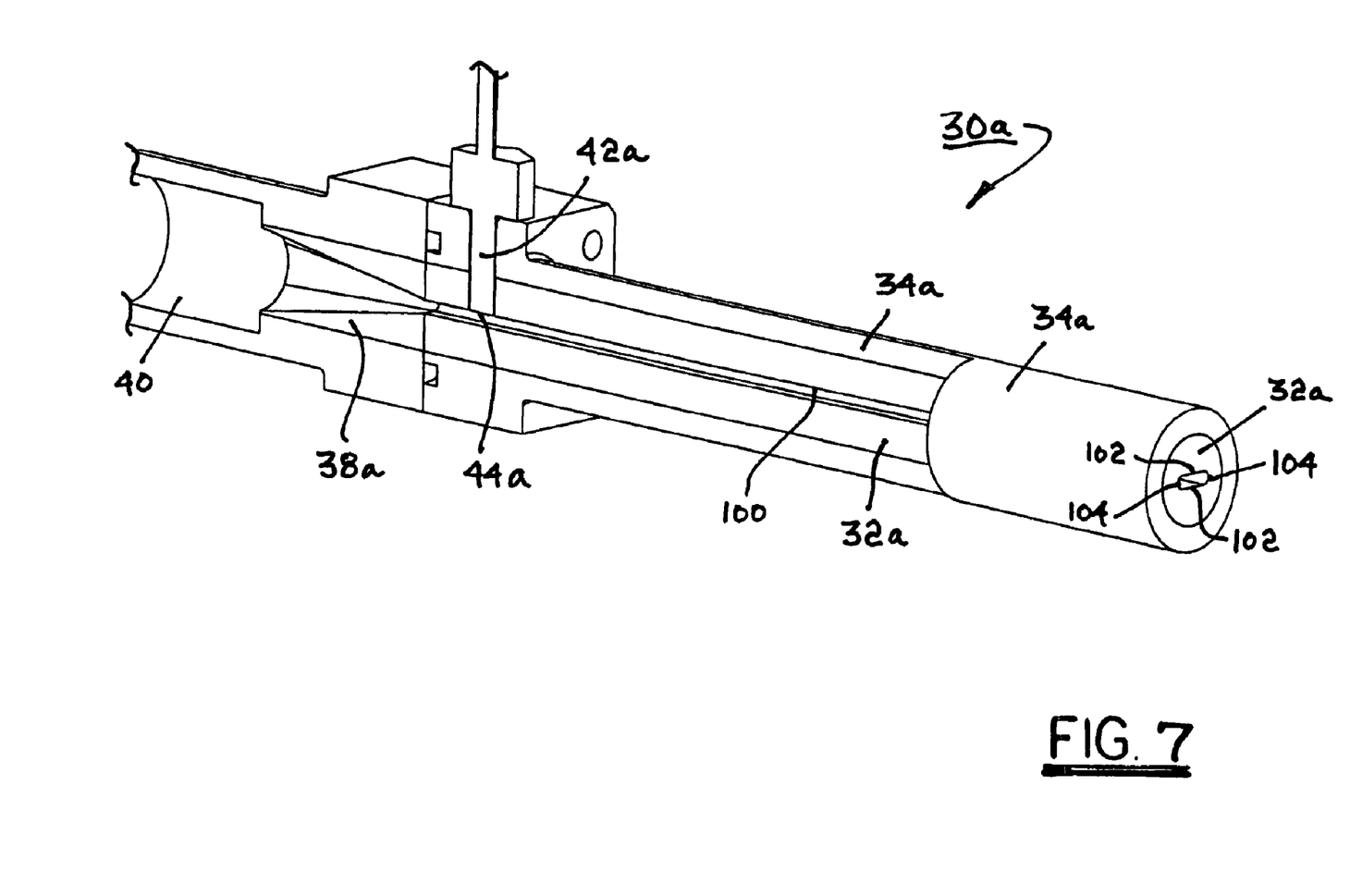
FIG. 7 is an isometric view, partially in cutaway, of an improved viscometric nozzle in accordance with the invention.

Referring to FIG. 7, an improved dispensing nozzle 30a is an inline capillary rheometer or viscometer at the discharge end of fluid delivery system 50 and comprises a barrel 32a formed of a non-magnetic material, for example, stainless steel or ceramic. Barrel 32a is surrounded by a magnetic shield 34a formed preferably of a magnetically soft material, for example, low-carbon cold rolled steel. A non-magnetic transition piece 38a smoothly narrows the MR fluid flow from the diameter of the supply line 40 into barrel 32a. Extending through shield 34a and barrel 32a and exposed to the material flowpath is a pressure transducer 42a for sensing line pressure at the entrance to the capillary tube and sending a signal thereof to computer 28. Since nozzle 30a is disposed at the end of the delivery line, the pressure drop through the nozzle may be measured relative to ambient pressure, and thus only one pressure transducer is required. Computer 28 is programmed with an algorithm for calculating MR fluid viscosity as a function of pressure and flowrate through nozzle 30a. When a predetermined upper viscosity control limit is exceeded, computer 28 signals replenishment pump 46 to inject a computer-calculated replenishing amount of carrier fluid into either return line 16 or mixing/tempering vessel 52 wherein the fluid is mixed into the recirculating MR fluid.

A particular feature and advantage of nozzle 30a over prior art nozzle 30 is the incorporation of a non-cylindrical slot-shaped flow passage 100 through barrel 32a rather than the conventional cylindrical flow passage in nozzle 30. Passage 100 has first and second opposed parallel planar walls 102 having a longer transverse length than third and fourth opposed walls 104. A first advantage is that passage 100 dispenses MR fluid onto carrier surface 12 as a preformed ribbon. A second advantage is that pressure transducer 42a may be mounted in a planar wall 102 of passage 100, permitting the use of an inexpensive flush diaphragm 44a in replacement of the prior art diaphragm 44. A third advantage is that a slot-shaped passage exhibits increased viscous drag of the MR fluid because of greater surface area per unit length; therefore, a significantly shorter nozzle can yield a back pressure at transducer 42a equal to the back pressure present at prior art transducer 42.

Pressure drop along a slot-like channel and a round pipe are presented as follows:

$$\Delta P_{slot} = \frac{2\mu L_{slot} Q}{b^3 w} \quad \text{(Eq. 1)}$$

$$\Delta P_{pipe} = \frac{8\mu L_{pipe} Q}{\pi R_{pipe}^4} \quad \text{(Eq. 2)}$$

where $\mu$ is fluid viscosity, $L_{slot}$ is slot length, b is slot half-height, w is the width of the channel, $L_{pipe}$ is pipe length, R is pipe radius and Q is flow rate. When the pressure drop, flow rate, and viscosity in both channels are the same, then $$\frac{2L_{slot}}{b^3 w} = \frac{8L_{pipe}}{\pi R^4} \quad \text{(Eq. 3)}$$

or $$L_{slot} = L_{pipe} \frac{4b^3 w}{\pi R^4} \quad \text{(Eq. 4)}$$

To provide the same fluid velocity in both channels, the channels' cross sectional areas must be the same $$2b\ w = 3.14 R^2 \text{ and } L_{slot} = L_{pipe}(2b^2/R^2) \quad \text{(Eq. 5)}$$

The cross-sectional area of a cylindrical tube having a radius of 1.5 mm is about the same as the cross-sectional area of a slot-shaped passage having a slot height of 1.5 mm and slot width of 5 mm. Thus, for example, a prior art cylindrical nozzle 30 having a tube length of 200 mm can be replaced with an improved nozzle 30a having a barrel 32a with a slot length of about 100 mm. Such a shortening of the nozzle greatly enhances the desirable compactness of an MR fluid delivery system.

From the foregoing description it will be apparent that there has been provided an improved delivery system for magnetorheological fluid. Variations and modifications of the herein described fluid delivery system will undoubtedly suggest themselves to those skilled in this art. Accordingly, the foregoing description should be taken as illustrative and not in a limiting sense.

What is claimed is:

1. A system for metering flow of a magnetorheological fluid through a conduit means, comprising:
   a) centrifugal pump means for pressurizing said fluid within said conduit means;
   b) means including a magnetic valve for controllably varying the flow rate of said pressurized fluid through said conduit means;
   c) flow measurement means serially connected to said magnetic valve for determining said rate of flow;
   d) programmable control means operationally connected to said flow measurement means and to said magnetic valve for adjusting said magnetic valve in response to signals from said flow measurement means to control said rate of flow to a predetermined aim; wherein said magnetic valve includes
   first and second magnet polepieces coaxially disposed, each having an axial flow passage therethrough, said polepieces being axially spaced apart and being tapered on an outer surface thereof towards each other;
   a non-magnetic spacer having an axial flow passage therethrough and being disposed between said first and second polepieces; and
   solenoidal electrical windings surrounding said polepieces and said spacer for controllably providing a magnetic field within said flow passage in response to energizing signals.

2. A system in accordance with claim 1 wherein said magnetic valve is further provided with first and second nipples extending from said first and second polepieces for attaching said valve into said conduit means.

3. A magnetic flow control valve for variably stiffening a magnetorheological fluid passing therethrough to increase viscous drag of the fluid in the valve, comprising:
   a) first and second magnet polepieces coaxially disposed and each having an axial flow passage therethrough, said polepieces being axially spaced apart and being tapered on an outer surface thereof towards each other;
   b) a non-magnetic spacer having an axial flow passage therethrough and being disposed between said first and second polepieces; and
   c) solenoidal electrical windings surrounding said polepieces and said spacer and connectable to an electrical source for controllably providing a magnetic field within said flow passage in response to energizing signals.

4. A nozzle for dispensing magnetorheological fluid, comprising a barrel having a longitudinal flow passage slot-shaped in cross-section, further comprising a magnetic shield surrounding said barrel.

5. A nozzle in accordance with claim 4 further comprising a pressure transducer disposed in said slot-shaped passage.

6. A fluid delivery system including components interconnected by tubing for managing the delivery, recovery, and reconditioning of magnetorheological fluid for a magnetorheological finishing apparatus, comprising:
   a) a tempering and mixing vessel having a chamber including an inner wall and a bottom and having at least one passage entering said chamber for admission of MR fluid to said chamber, the axis of said passage being substantially tangential to said inner wall and proximal to said bottom to cause mixing of said MR fluid, said vessel being further provided with heat exchanging means for tempering the MR fluid;
   b) a centrifugal pump for pressurizing the MR fluid by pumping the fluid from said vessel through said tubing;
   c) a magnetic flow control valve hydraulically connected in series with said pump;
   d) a flowmeter hydraulically connected in series with said pump and said valve;
   e) programmable control means for receiving input signals from said flowmeter indicative of a rate of MR fluid flow therethrough and for providing output signals to said flow control valve to adjust said rate of fluid flow to a predetermined rate; and
   f) nozzle means hydraulically connected in series with said flowmeter for receiving MR fluid therefrom and dispensing said fluid to said finishing apparatus, wherein said pump is disposed within said vessel.

* * * * *